United States Patent
Heinrich et al.

(10) Patent No.: US 6,840,417 B2
(45) Date of Patent: Jan. 11, 2005

(54) MOTORCYCLE TRUNK AND MOTORCYCLE WITH ATTACHED MOTORCYCLE TRUNK

(75) Inventors: Edgar Heinrich, Freising (DE); Michael Eder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 10/265,587

(22) Filed: Oct. 8, 2002

(65) Prior Publication Data

US 2003/0066854 A1 Apr. 10, 2003

(30) Foreign Application Priority Data

Oct. 10, 2001 (DE) .......................................... 101 50 055

(51) Int. Cl.⁷ .................................................. B62J 9/00
(52) U.S. Cl. ...................... 224/413; 224/430; 224/431; 224/433
(58) Field of Search ................................ 224/413, 429, 224/430, 427, 416, 449, 42.11, 431, 433, 442, 423; 190/103, 104, 105, 107

(56) References Cited

U.S. PATENT DOCUMENTS

| | | | |
|---|---|---|---|
| 3,362,596 A | * | 1/1968 | Bostwick ..................... 224/430 |
| 3,903,944 A | * | 9/1975 | Montgomery et al. ...... 224/430 |
| 4,096,980 A | * | 6/1978 | Clow ........................... 224/430 |
| 4,271,996 A | * | 6/1981 | Montgomery ................ 224/430 |
| 4,387,835 A | * | 6/1983 | Golzer ......................... 224/430 |
| 4,516,705 A | * | 5/1985 | Jackson ........................ 224/430 |
| 4,562,944 A | * | 1/1986 | Jackson et al. .............. 224/430 |
| 4,577,786 A | | 3/1986 | Dowrick et al. |
| 4,630,717 A | * | 12/1986 | Tong ............................ 190/104 |
| 5,271,540 A | | 12/1993 | Katz et al. |
| 5,435,471 A | * | 7/1995 | Chuang ....................... 224/449 |
| 5,497,919 A | | 3/1996 | Klinger |
| 5,931,360 A | | 8/1999 | Reichert |
| 6,053,384 A | * | 4/2000 | Bachman ..................... 224/430 |
| 6,220,411 B1 | * | 4/2001 | Scicluna et al. ............. 190/105 |
| 6,505,765 B1 | * | 1/2003 | Proctor et al. .............. 224/413 |

FOREIGN PATENT DOCUMENTS

| | | |
|---|---|---|
| DE | 456183 | 2/1928 |
| DE | 456 183 | 2/1928 |
| DE | 80 22 714 | 3/1981 |
| DE | 8022714.1 | 3/1981 |
| DE | 3013593 | 11/1981 |
| DE | 8424404.6 | 11/1984 |
| DE | 8705268.7 | 7/1987 |
| DE | 69316704 | 5/1998 |
| DE | 19841748 | 3/2000 |
| DE | 20010581 | 1/2001 |

OTHER PUBLICATIONS

Japanese Abstract of JP11217094, published Aug. 10, 1999.
Copy of German search report dated Sep. 4, 2003.

\* cited by examiner

*Primary Examiner*—Nathan J. Newhouse
(74) *Attorney, Agent, or Firm*—Crowell & Moring LLP

(57) ABSTRACT

A trunk system which is intended for motorcycles and which, together with a luggage rack disposed in the rear area of the motorcycle, forms a plane. The result is an expanded, stable supporting surface for additional luggage.

18 Claims, 2 Drawing Sheets

MOTORCYCLE TRUNK AND MOTORCYCLE WITH ATTACHED MOTORCYCLE TRUNK

This application claims the priority of German Patent Document No. 101 50 055.6, filed Oct. 10, 2001, the disclosure of which is expressly incorporated by reference herein.

BACKGROUND AND SUMMARY OF THE INVENTION

The present invention relates to a motorcycle trunk and a motorcycle with an attached motorcycle trunk.

The German Patent Document No. DE 198 41 748 A1 discloses a motorcycle, where a side trunk is disposed on both sides in the area of the rear wheel. The shape of the side trunks is adapted to the design of the motorcycle fairing. In the center of the motorcycle a top case, whose side areas border on the side trunks in the downward direction, is mounted on both motorcycle trunks.

The object of the present invention is to provide a motorcycle trunk system, which is optimized with respect to the attachment possibilities of additional luggage.

The basic principle of the invention consists of a trunk system, which together with a luggage rack, disposed in the rear area of the motorcycle, forms a plane. The result is an expanded, stable supporting surface for additional luggage.

The motorcycle trunk(s) and the luggage rack do not have to be absolutely flat over the entire surface of their upper sides, but rather the design can be adapted to the rest of the motorcycle. Rather, it is sufficient if the upper sides of the motorcycle trunk(s) and the luggage rack exhibit several elevations, whose upper sides in turn are also flat. Then, the additional luggage to be fastened lies primarily only on the elevations lying in a plane. The elevations can be made preferably of different material than that of the motorcycle trunk. The upper sides of the elevations can be rubberized, for example, or coated with another anti-slip material, a feature that facilitates fastening the luggage.

Interacting fastenings means, located on the side of the motorcycle and trunk(s), are provided to attach the motorcycle trunk(s) to the motorcycle. For example, the inner side wall of the motorcycle trunk can exhibit a hook-like fastening element, which can be suspended from an allocated fastening element on the side of the motorcycle.

Preferably the motorcycle-sided fastening element is connected as one piece to the luggage rack. This feature has the advantage that the luggage rack and the motorcycle-sided fastening element can be produced in one working step, for example, as an injection molded part. Thus, a fastening element, which is to be attached subsequently to the motorcycle frame and which is intended for the trunk, can be dispensed with, at least in the upper trunk area.

The interacting fastening elements on the trunk side and/or the motorcycle side exhibit preferably a locking mechanism to close securely the motorcycle trunk. The lock can be integrated, for example, into the motorcycle trunk.

According to a further development of the invention, the motorcycle trunk can be pulled out laterally. That is, the motorcycle trunk exhibits a sliding wall member, which makes it possible to adjust the width of the trunk in the transverse direction of the motorcycle. If, for example, in city traffic there is no need for the entire possible trunk volume, then the trunk can be pushed together laterally. In so doing, the entire width of the motorcycle is decreased, a feature that contributes to an improvement of the driving safety.

Preferably it is provided that the luggage rack is disposed below a removable passenger seat bench. If the driver is driving alone, the passenger seat bench can be removed and the luggage rack and the upper side of the motorcycle trunk(s) can be used as the luggage support.

Other objects, advantages and novel features of the present invention will become apparent from the following detailed description of the invention when considered in conjunction with the accompanying drawings.

BRIEF DESCRIPTION OF THE DRAWINGS

The invention is explained in detail below by means of the embodiments with reference to the drawings, in which.

DETAILED DESCRIPTION OF THE DRAWINGS

Figure 1:
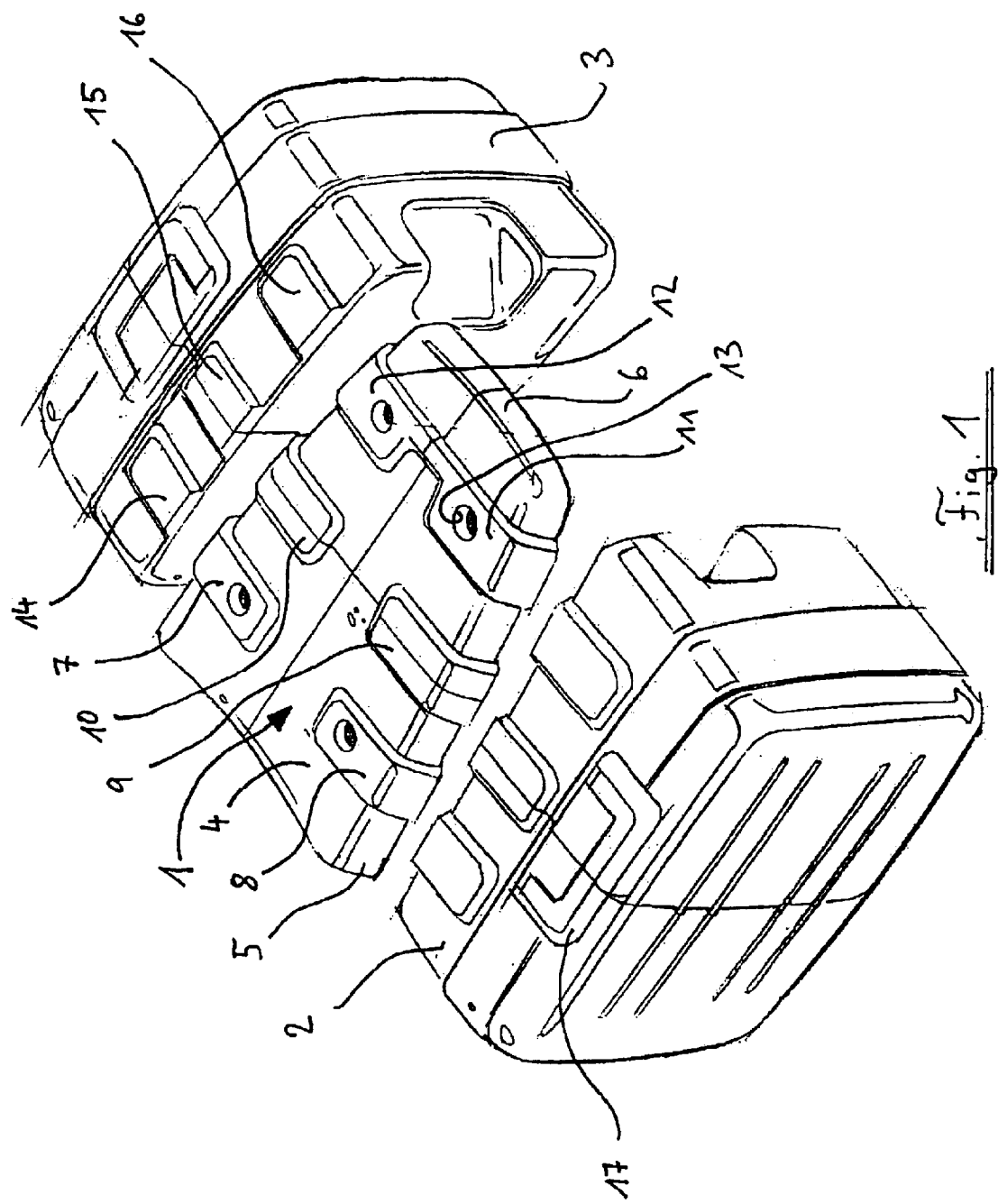
FIG. 1 is a perspective view of a luggage rack with two motorcycle trunks, which can be attached to the side of the motorcycle.

FIG. 1 depicts a luggage rack 1, disposed in the rear area of a motorcycle, and two side trunks 2, 3, which can be attached on the side to the motorcycle. The luggage rack 1 exhibits a base plate 4 with peripheral edges 5, 6, which descend on the side in the downward direction. The base plate 4 exhibits several elevations 7–12, whose upper sides lie in a common plane. Each elevation 7, 8, 11, 12 exhibits a recess 13, which makes it possible to attach a passenger seat bench (not illustrated) or a top case on the luggage rack 1.

The upper sides of the two side trunks 2, 3 also exhibit elevations 14–16, which lie here in essence in alignment with the elevations 7, 10, and 12 of the luggage rack 1. In this case it is important that the upper sides of the elevations 14–16 lie in a plane with the upper sides of the elevations 7–12, so that the result is a stable luggage support for additional luggage.

For the sake of completeness, reference must also be made to the luggage handles 17, which can be folded over to the side and in the folded over position shown here, they lie below the upper sides of the elevations 7–12 or 14–16.

As an alternative to the attachment of a passenger seat bench, the recesses 13 also enable the attachment of a top case.

Figure 2:
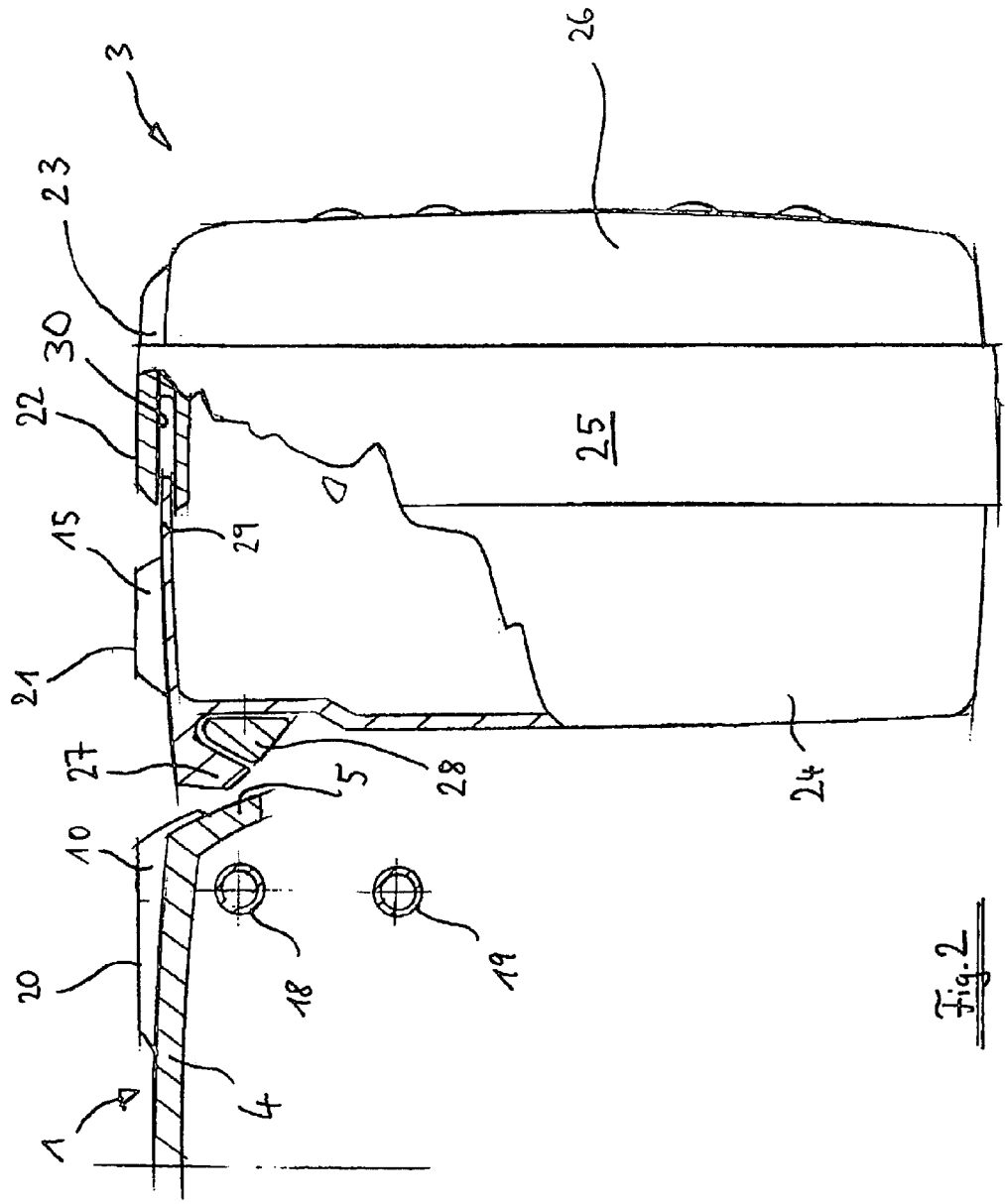
FIG. 2 is a cross sectional view of the luggage rack and the motorcycle luggage, depicted on the right in FIG. 1.

FIG. 2 is a cross sectional view of the luggage rack 1 and the right side trunk 3. The luggage rack 1 is attached to the frame 18, 19 of the motorcycle in a manner that is not illustrated here in detail. It is evident that the base plate 4 of the luggage rack 1 slopes in the direction of the edge 5. The elevation 12 exhibits a flat horizontal upper side 20, which lies in a plane with the upper side 21 of the elevation 15 and the upper side 22 of an elevation 23.

It is evident that the side trunk 3 comprises three elements, that is an inner element 24, a center element 25 and an outer element 26. The upper area of the inner element 24 exhibits a fastening hook 27, by means of which the trunk 3 is suspended from a complementarily shaped fastening element 28. The fastening element 28 is connected as one piece here to the luggage rack 1, a feature, however, that is not evident from the cross sectional drawing depicted here. The luggage rack 1 and/or the fastening element 28 can be produced, for example, as an injection molded element 28 in one working step. Thus, a mounting bracket, which is fastened on the motorcycle frame and provided in conventional trunk systems, can be dispensed with.

It is clear from the cross sectional drawing of the trunk 3 that the center element 25 exhibits a slot-like recess 30, into which a side wall area 29 of the inner element 24 can be slid. In this manner the width of the side trunk 3 is adjustable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle trunk with fastening means, for fastening in a side rear wheel area of a motorcycle, wherein the motorcycle trunk is designed in such a manner and the fastening means are arranged in such a manner that an upper side of the motorcycle trunk, when attached to the motorcycle, lies approximately in a same plane as an upper side of a luggage rack provided on the motorcycle, and further wherein the upper side of the luggage rack and the upper side of the motorcycle trunk exhibit a plurality of raised elevation sections whose upper sides are flat, with lower elevation sections between adjacent raised elevations, whereby the upper sides of the elevations lie in a common plane and form a supporting surface for luggage when attached to the motorcycle.

2. The motorcycle trunk as claimed in claim 1, wherein the motorcycle trunk exhibits a movable wall member for adjusting a width of the motorcycle trunk in a transverse direction of the motorcycle.

3. The motorcycle trunk as claimed in claim 1, wherein the luggage rack exhibits fastening elements for attaching a passenger seat bench and, when the passenger seat bench is removed, the luggage rack serves as a luggage dump.

4. The motorcycle trunk as claimed in claim 1, wherein a motorcycle-sided side wall of the motorcycle trunk exhibits at least one hook-shaped fastening element.

5. The motorcycle trunk as claimed in claim 4, wherein the hook-shaped fastening element is open in a direction of a bottom side of the motorcycle trunk.

6. The motorcycle trunk as claimed in claim 4, further including a motorcycle-sided fastening element which is assigned to the hook-shaped fastening element of the motorcycle trunk.

7. The motorcycle trunk as claimed in claim 6, wherein the motorcycle-sided fastening element is attached to the luggage rack.

8. The motorcycle trunk as claimed in claim 7, wherein the motorcycle-sided fastening element is connected as one piece to the luggage rack.

9. A motorcycle trunk as claimed in claim 6, including a locking mechanism for closing securely the motorcycle trunk to the motorcycle in cooperation with the hook-shaped fastening element and the motorcycle-sided fastening element.

10. A motorcycle with a luggage rack provided above a rear wheel of the motorcycle and at least one motorcycle trunk fastened in a side rear wheel area of the motorcycle wherein an upper side of the motorcycle trunk lies approximately in a same plane as an upper side of the luggage rack, and further wherein the upper side of the luggage rack and the upper side of the motorcycle trunk exhibit a plurality of raised elevation sections whose upper sides are flat, with lower elevation sections between adjacent raised elevations, whereby the upper sides of the elevations lie in a common plane and form a supporting surface for luggage.

11. The motorcycle as claimed in claim 10, wherein the motorcycle trunk exhibits a movable wall member for adjusting a width of the motorcycle trunk in a transverse direction of the motorcycle.

12. The motorcycle as claimed in claim 10, wherein the luggage rack exhibits fastening elements for attaching a passenger seat bench and, when the passenger seat bench is removed, the luggage rack serves as a luggage dump.

13. The motorcycle as claimed in claim 10, wherein a motorcycle-sided side wall of the motorcycle trunk exhibits at least one hook-shaped fastening element.

14. The motorcycle as claimed in claim 13, wherein the hook-shaped fastening element is open in a direction of a bottom side of the motorcycle trunk.

15. The motorcycle as claimed in claim 13, further including a motorcycle-sided fastening element which is assigned to the hook-shaped fastening element of the motorcycle trunk.

16. The motorcycle as claimed in claim 15, wherein the motorcycle-sided fastening element is attached to the luggage rack.

17. The motorcycle as claimed in claim 16, wherein the motorcycle-sided fastening element is connected as one piece to the luggage rack.

18. The motorcycle as claimed in claim 15, including a locking mechanism for closing securely the motorcycle trunk to the motorcycle in cooperation with the hook-shaped fastening element and the motorcycle-sided fastening element.

* * * * *